United States Patent
Wade et al.

(10) Patent No.: US 11,314,420 B2
(45) Date of Patent: *Apr. 26, 2022

(54) DATA REPLICA CONTROL

(71) Applicant: Quantum Corporation, San Jose, CA (US)

(72) Inventors: Gregory L. Wade, San Jose, CA (US); J. Mitchell Haile, Somerville, MA (US)

(73) Assignee: QUANTUM CORPORATION, San Jose, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/400,265

(22) Filed: Jan. 6, 2017

(65) Prior Publication Data

US 2017/0115909 A1 Apr. 27, 2017

Related U.S. Application Data

(63) Continuation of application No. 13/157,937, filed on Jun. 10, 2011, now Pat. No. 9,558,074.

(60) Provisional application No. 61/353,750, filed on Jun. 11, 2010, provisional application No. 61/353,791, filed on Jun. 11, 2010.

(51) Int. Cl.
| | |
|---|---|
| *G06F 12/00* | (2006.01) |
| *G06F 13/00* | (2006.01) |
| *G06F 3/06* | (2006.01) |
| *G06F 11/14* | (2006.01) |
| *G06F 11/20* | (2006.01) |

(52) U.S. Cl.
CPC ............ *G06F 3/0619* (2013.01); *G06F 3/065* (2013.01); *G06F 3/067* (2013.01); *G06F 3/0665* (2013.01); *G06F 11/1453* (2013.01); *G06F 11/1456* (2013.01); *G06F 11/2094* (2013.01); *G06F 2201/815* (2013.01)

(58) Field of Classification Search
CPC ............ G06F 11/1453; G06F 11/1456; G06F 11/2094; G06F 2201/815; G06F 3/065; G06F 3/0619; G06F 3/0665; G06F 3/067
USPC ........................................ 711/162
See application file for complete search history.

(56) References Cited

U.S. PATENT DOCUMENTS

| | | | | |
|---|---|---|---|---|
| 5,363,487 A | * | 11/1994 | Willman | G06F 17/30067 707/E17.01 |
| 6,530,078 B1 | * | 3/2003 | Shmid | G06F 9/45537 703/27 |
| 7,216,366 B1 | | 5/2007 | Raz et al. | |
| 7,356,679 B1 | * | 4/2008 | Le | G06F 17/30067 707/E17.01 |
| 7,447,854 B1 | * | 11/2008 | Cannon | G06F 11/1451 711/162 |

(Continued)

*Primary Examiner* — Sheng Jen Tsai
(74) *Attorney, Agent, or Firm* — Roeder & Broder LLP; James P. Broder

(57) ABSTRACT

A replica control system includes software to control replication in virtual environments. The replica control system identifies a plurality of data blocks within an underlying storage volume in response to a request to update a replica of a target storage volume, identifies changed data blocks of the plurality of data blocks within the underlying storage volume, and identifies a subset of the changed data blocks with which to update the replica of the target storage volume based on a characteristic of the changed data blocks.

19 Claims, 10 Drawing Sheets

(56) References Cited

U.S. PATENT DOCUMENTS

| | | | |
|---|---|---|---|
| 7,743,028 B1* | 6/2010 | Stringham | G06F 11/1451 707/646 |
| 7,873,600 B2* | 1/2011 | Murayama | G06F 3/0665 707/640 |
| 7,900,088 B1* | 3/2011 | Pawar | G06F 17/30144 711/162 |
| 7,904,419 B1* | 3/2011 | Milby | G06F 17/30312 707/614 |
| 8,060,476 B1* | 11/2011 | Afonso | G06F 11/1451 707/649 |
| 8,135,930 B1* | 3/2012 | Mattox | G06F 9/45558 711/100 |
| 8,156,301 B1 | 4/2012 | Khandelwal et al. | |
| 8,185,684 B1* | 5/2012 | Naftel | G06F 9/45558 711/173 |
| 8,255,650 B1* | 8/2012 | Gruttadauria | G06F 9/44584 711/162 |
| 8,326,803 B1* | 12/2012 | Stringham | G06F 3/067 707/652 |
| 8,484,431 B1* | 7/2013 | Khandelwal | G06F 9/45558 711/112 |
| 8,621,165 B1* | 12/2013 | Sridharan | G06F 11/1435 707/644 |
| 8,635,429 B1* | 1/2014 | Naftel | G06F 12/16 711/162 |
| 8,640,241 B2 | 1/2014 | Wade et al. | |
| 8,707,005 B2 | 4/2014 | Wade et al. | |
| 8,738,883 B2 | 5/2014 | Wade et al. | |
| 8,756,598 B1* | 6/2014 | Costea | G06F 9/45558 717/174 |
| 8,918,606 B1* | 12/2014 | Stringham | G06F 12/0223 711/162 |
| 2002/0144068 A1* | 10/2002 | Ohran | G06F 11/1464 711/161 |
| 2003/0014585 A1* | 1/2003 | Ji | G06F 3/0601 711/112 |
| 2003/0101321 A1* | 5/2003 | Ohran | G06F 11/1451 711/162 |
| 2004/0083244 A1* | 4/2004 | Muecklich | G06F 17/30581 |
| 2004/0186898 A1* | 9/2004 | Kimura | G06F 3/0613 709/213 |
| 2005/0015599 A1 | 1/2005 | Wang et al. | |
| 2005/0131965 A1* | 6/2005 | Lam | G06F 11/1451 |
| 2005/0132206 A1 | 6/2005 | Palliyil et al. | |
| 2005/0144202 A1* | 6/2005 | Chen | G06F 11/2066 |
| 2006/0010314 A1* | 1/2006 | Xu | G06F 9/45545 713/2 |
| 2006/0036901 A1* | 2/2006 | Yang | G06F 11/1076 714/6.12 |
| 2006/0089951 A1* | 4/2006 | Factor | G06F 11/3485 |
| 2006/0206628 A1* | 9/2006 | Erez | H04N 1/00204 710/8 |
| 2007/0074290 A1 | 3/2007 | Kobayashi et al. | |
| 2007/0288533 A1* | 12/2007 | Srivastava | G06F 17/30215 |
| 2007/0291843 A1* | 12/2007 | Chappalli | H04N 19/51 375/240.16 |
| 2008/0005145 A1* | 1/2008 | Worrall | G06F 17/30233 |
| 2008/0127348 A1* | 5/2008 | Largman | G06F 21/56 726/24 |
| 2008/0133518 A1 | 6/2008 | Kapoor et al. | |
| 2008/0177994 A1* | 7/2008 | Mayer | G06F 9/4418 713/2 |
| 2008/0243840 A1 | 10/2008 | Bhandari | |
| 2008/0244355 A1* | 10/2008 | Bhandari | G06F 17/2211 714/755 |
| 2009/0006792 A1* | 1/2009 | Federwisch | G06F 17/30067 711/162 |
| 2009/0077327 A1* | 3/2009 | Hara | G06F 3/0608 711/154 |
| 2009/0089880 A1 | 4/2009 | Kobayashi et al. | |
| 2009/0158432 A1 | 6/2009 | Zheng et al. | |
| 2009/0240904 A1* | 9/2009 | Austruy | G06F 11/1662 711/162 |
| 2010/0011178 A1 | 1/2010 | Feathergill | |
| 2010/0125573 A1* | 5/2010 | Venolia | G06F 17/30991 707/722 |
| 2010/0223531 A1* | 9/2010 | Fukutomi | G06F 11/1052 714/764 |
| 2010/0235831 A1* | 9/2010 | Dittmer | G06F 9/45558 718/1 |
| 2010/0257155 A1* | 10/2010 | Dettinger | G06F 17/30424 707/722 |
| 2010/0257331 A1* | 10/2010 | Frank | G06F 9/5022 711/166 |
| 2011/0060884 A1* | 3/2011 | Wade | G06F 17/30176 711/162 |
| 2011/0179082 A1* | 7/2011 | Vaghani | G06F 17/30067 707/781 |
| 2011/0179414 A1* | 7/2011 | Goggin | G06F 3/061 718/1 |
| 2011/0197039 A1* | 8/2011 | Green | G06F 3/0617 711/162 |
| 2011/0307659 A1* | 12/2011 | Hans | G06F 3/0613 711/114 |
| 2012/0016840 A1 | 1/2012 | Lin et al. | |
| 2012/0036239 A1* | 2/2012 | Donaghey | G06F 9/44563 709/221 |
| 2012/0059794 A1* | 3/2012 | Wade | G06F 17/30233 707/626 |
| 2012/0221807 A1* | 8/2012 | Wade | G06F 9/45558 711/154 |
| 2012/0290802 A1* | 11/2012 | Wade | G06F 11/1471 711/162 |
| 2013/0198246 A1* | 8/2013 | Scales | G06F 3/0608 707/821 |
| 2014/0250093 A1* | 9/2014 | Prahlad | G06F 11/1453 707/696 |

* cited by examiner

DATA REPLICA CONTROL

RELATED APPLICATIONS

This patent application is a continuation of U.S. patent application Ser. No. 13/157,937, entitled "DATA REPLICA CONTROL," filed on Jun. 10, 2011, which claims priority to U.S. Provisional Patent Application No. 61/353,750, entitled "Data Replication System For Smart Replication," filed on Jun. 11, 2010, and U.S. Provisional Patent Application No. 61/353,791, entitled "Fingerprint Analysis For Data Replication System," filed on Jun. 11, 2010, all of which are hereby incorporated by reference in their entirety.

TECHNICAL BACKGROUND

In the field of computer hardware and software technology, a virtual machine is a software implementation of a machine (computer) that executes program instructions like a real machine. Virtual machine technology allows for the sharing of, between multiple virtual machines, the physical resources underlying the virtual machines.

In virtual machine environments, storage volumes within the virtual machines contain data items that need to be accessed and scanned. Unfortunately, accessing the underlying contents of a storage volume can be very resource intensive, reducing the performance of a virtual machine and other operations within a virtual machine environment.

OVERVIEW

Systems, methods, and software to control replication in virtual environments are disclosed herein. In an embodiment, a replica control system identifies a plurality of data blocks within an underlying storage volume in response to a request to update a replica of a target storage volume, identifies changed data blocks of the plurality of data blocks within the underlying storage volume, and identifies a subset of the changed data blocks with which to update the replica of the target storage volume based on a characteristic of the changed data blocks.

In an embodiment, the characteristic of the changed data blocks comprises an allocation status of each of the changed data blocks.

In an embodiment, the characteristic of the changed data blocks comprises a transient status of each of the changed data blocks.

In an embodiment, the characteristic of the changed data blocks comprises a similarity of the changed data blocks relative to other changed data blocks, wherein the other changed data blocks are associated with another plurality of data blocks within another underlying storage volume.

In an embodiment, the similarity is based on an analysis of fingerprints of the changed data blocks and the other changed data blocks.

In an embodiment, the replica control system further direct the replica control system to generate an instruction for delivery to a replica virtual machine environment, wherein the instruction indicates one or more of the similarities of the each of the changed data blocks relative to the other changed data blocks.

In an embodiment, the target storage volume comprises an enumeration of a virtual machine environment and the underlying storage volume comprises a virtual disk file contained within the virtual machine environment.

In an embodiment, the target storage volume comprises a virtual disk file and the underlying storage volume comprises a hard disk drive upon which the virtual disk file is stored.

In an embodiment, the underlying storage volume comprises a virtual disk file and the target storage volume comprises a virtual drive contained within the virtual disk file.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In virtual machine environments, accessing the underlying contents of a storage volume can be very resource intensive, reducing the performance of a virtual machine and other operations within a virtual machine environment. Nonetheless, the underlying contents of a storage volume need to be accessed. For example, back-up utilities need to access the underlying contents of a storage volume in order to create and maintain a replica of the storage volume. Alternatively or additionally, it is appreciated that the underlying contents of a storage volume may need to be accessed for a variety of other reasons including, but not limited to, virus scanning, data forensics, compliance needs, logging system changes, including any combination or variation thereof.

Furthermore, in many cases the replica storage volumes are created and maintained in geographically diverse locations. Because the storage volumes often contain large amounts of data, creating and maintaining the replica storage volumes in geographically diverse locations requires transferring large amounts of data over long distances via one or more data networks. Accordingly, transferring these large amounts of data increases the resources and time required to create and maintain the replica storage volumes.

One way to increase efficiency while creating and maintaining replicas is to reduce the amount of data that needs to be accessed and transferred. This can be achieved by accessing and transferring only critical blocks of data contained within the storage volume. For example, when creating a replica at a geographically diverse location, a control system may transfer only those blocks that are allocated and non-transient. Once an initial replica is created, the control system may then only transfer blocks that have changed, are allocated, and are non-transient in order to maintain the replica.

Figure 1:
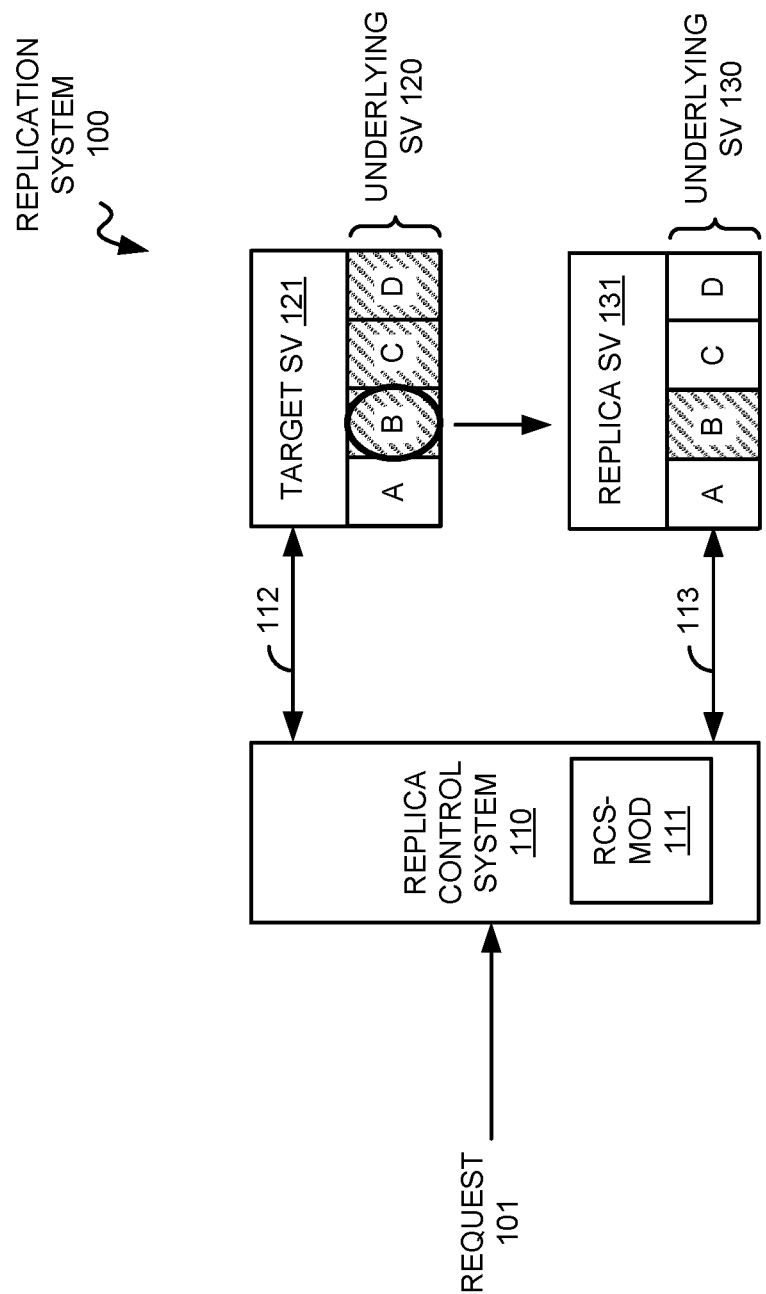
FIG. 1 illustrates a replication system in an embodiment.

FIG. 1 illustrates replication system 100. Replication system 100 includes replica control system 110, communication links 112-113, target storage volume 121, underlying storage volume 120, replica storage volume 131, and underlying storage volume 130. Replica control system 110 is in communication with target storage volume 121 and replica storage volume 131 via communication links 112 and 113, respectively.

Replica control system 110 includes replication control system module (RCS-MOD) 111. Replica control system 110 comprises any system or collection of systems capable of executing RCS-MOD 111 to identify data blocks within underlying storage volume 130. Replica control system 110 may be a micro-processor, an application specific integrated circuit, a general purpose computer, a server computer, or any combination or variation thereof. RCS-MOD 111 may be program instructions executable by a processing system within replica control system 110.

Underlying storage volumes 120 and 130 each comprise any storage volume capable of storing a volume of data. Underlying storage volumes 120 and 130 may be, for example, a virtual disk file in a virtual machine environment or a hard disk drive upon which the virtual disk file is stored. The hard disk drive may be a single disk, a disk array, or some other type of storage system, including any combination or variation thereof. Furthermore, the hard disk may be within a computer or server computer.

Likewise, target storage volume 121 and replica storage volume 131 each comprise any storage volume within an underlying storage volume that is capable of storing a volume of data. Target storage volume 121 and replica storage volume 131 may be, for example, an enumeration of a virtual machine environment, a virtual disk file in a virtual machine environment, or a virtual drive contained within a virtual disk file in a virtual machine environment. In this example, target storage volume 121 includes blocks A, B, C, and D. Each block comprises a section of underlying storage volume 120. Replica storage volume 131 is an updated or modified version of target storage volume 131 including blocks A, B, C, and D. It is appreciated that a replica storage volume may not be exact copy of the target storage volume when created and/or after modification.

In operation, replica control system 110 executing RCS-MOD 121 identifies a subset of changed data blocks within underlying storage volume 130 based on a characteristic of the changed data blocks. The changed data blocks are shown with shading from top right to bottom left. In this example, blocks B, C, and D have changed.

The subset of the changed data blocks is shown with a circle. In this example, block B comprises the subset of the changed blocks identified by replica control system 120 based on a characteristic. The characteristic may be any feature or property that uniquely identifies the block and/or differentiates the block from other blocks. The characteristic may be, for example, an allocation status, a transient status, a similarity of the changed data blocks relative to other changed data blocks in another target storage volume (not shown for simplicity), and/or any combination or variation thereof.

Figure 2:
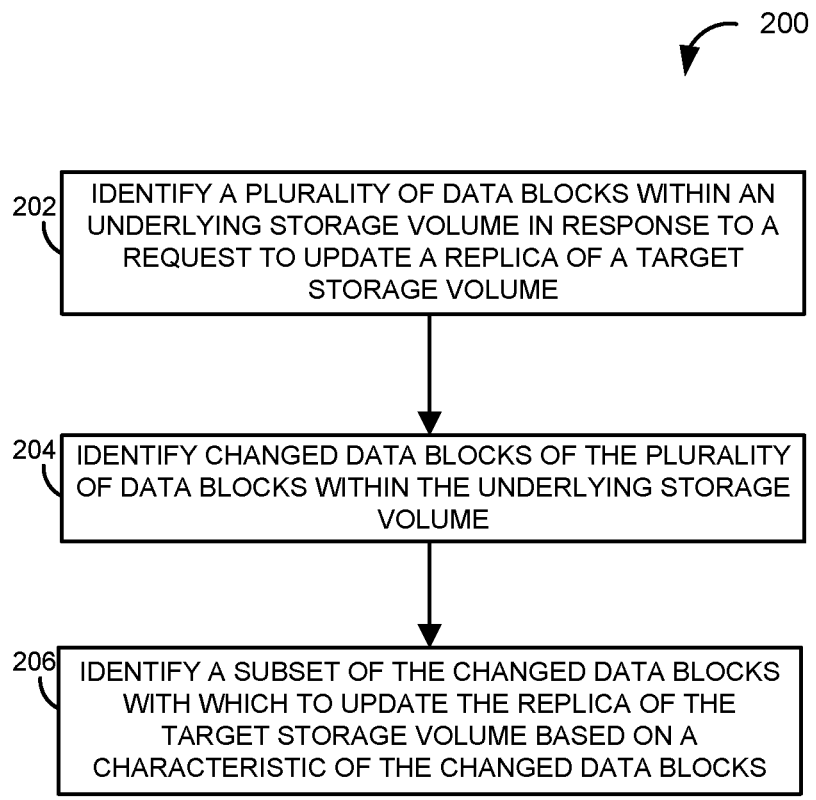
FIG. 2 illustrates operation of replica control system in an embodiment.

FIG. 2 illustrates process 200 describing operation of replica control system 110 in replication system 100. More specifically, process 200 describes operation of replica control system 120 executing RCS-MOD 121 to identify a subset of changed data blocks within underlying storage volume 130 based on a characteristic of the changed data blocks. To begin, replica control system 110 receives a request to update a replica of a target storage volume. For example, replica control system 110 may receive request 101 from a data utility in order to update or maintain replica storage volume 131.

In response to the request to update a replica of a target storage volume, replica control system 110 identifies a plurality of data blocks within an underlying storage volume (Step 202). For example, in response to receiving request 101 replica control system 110 executing RCS-MOD 121 identifies data blocks A, B, C, and D of target storage volume 121 within underlying storage volume 120. Replica control system 110 may identify the plurality of data blocks by accessing a configuration file or block list maintained and/or managed by a file system control utility. Alternatively or additionally, the data blocks are determined using files obtained from a hypervisor operating on a storage system within a virtual machine environment.

Replica control system 110 executing RCS-MOD 121 then identifies changed data blocks of the plurality of data blocks within the underlying storage volume (Step 204). For example, replica control system 110 executing RCS-MOD 121 identifies changed data blocks of the identified data blocks A, B, C, and D of target storage volume 121 within underlying storage volume 120. The changed data blocks are shown with shading from top right to bottom left. In this example, blocks B, C, and D have changed.

The changed blocks may be identified using a changed block list that is managed and/or maintained by a hypervisor in a virtual machine environment. It is appreciated that a changed block list may alternatively or additionally be generated and/or managed by any entity within a virtual machine (such as a guest operating system), a processing system within the virtual machine environment, and/or a storage system within the virtual machine environment. Furthermore, in some cases, a changed block list may be generated by replication software, continuous data protection (CDP) software, or virtual disk change block tracking software running on a virtual machine, hypervisor, or a processing system within the virtual machine environment.

Replica control system 110 executing RCS-MOD 121 then identifies a subset of the changed data blocks with which to update the replica of the target storage volume based on a characteristic of the changed data blocks (Step 206). For example, replica control system 110 may examine the identified changed data blocks B, C, and D of target storage volume 121 within underlying storage volume 120 in order to determine which of the data blocks have a specified characteristic. In this example, block B comprises the subset of the changed blocks identified by replica control system 120 based on a characteristic. As discussed, the characteristic may be any feature or property that uniquely identifies a property of the block and/or differentiates the block from other blocks. The characteristic may be, for example, an allocation status, a transient status, a similarity of the changed data blocks relative to other changed data blocks in another target storage volume (not shown for simplicity), and/or any combination or variation thereof.

Figure 3:
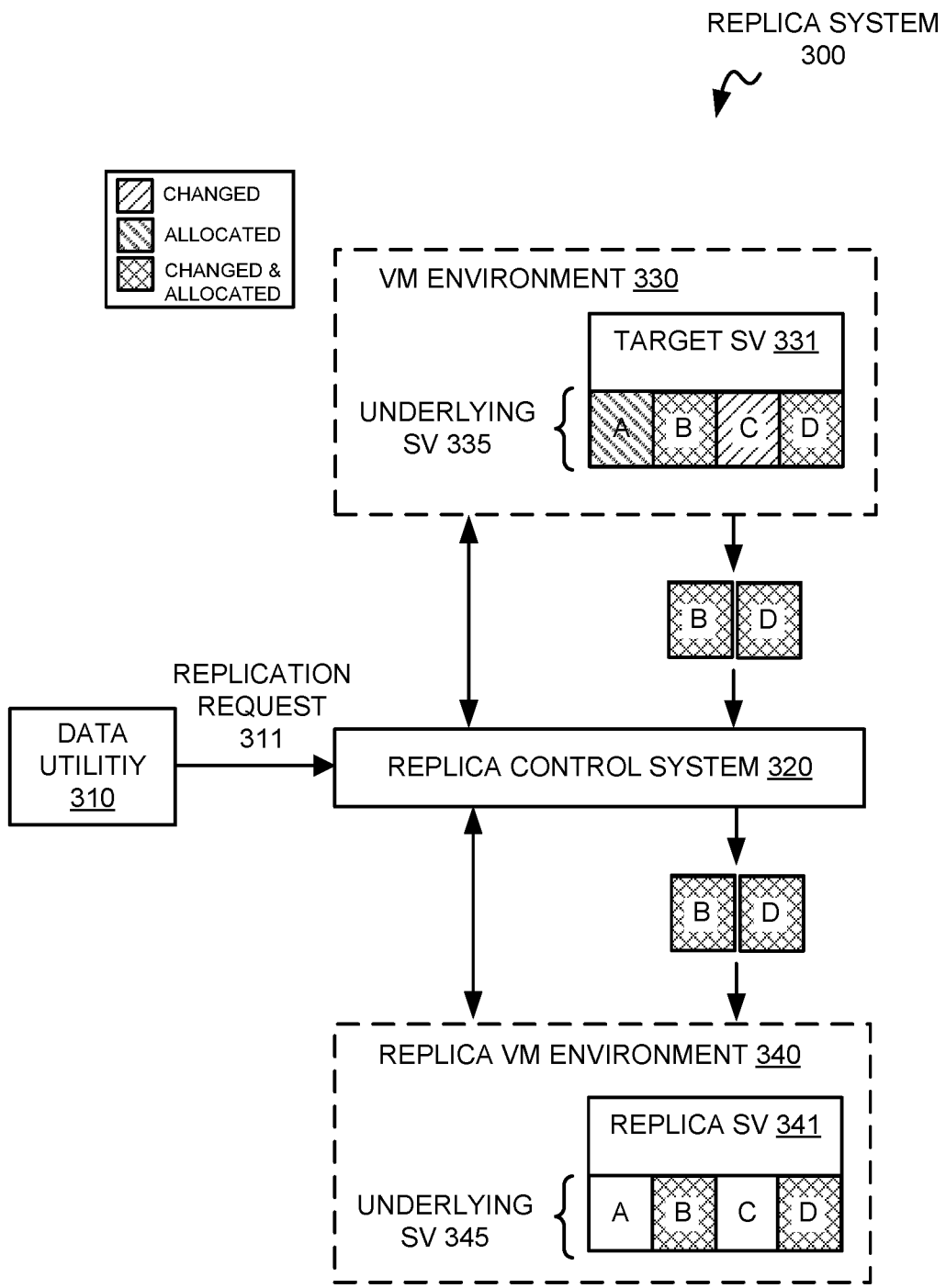
FIG. 3 illustrates a replication system in an embodiment.

FIG. 3 illustrates replication system 300. In particular, FIG. 3 illustrates replica control system 320 configured to receive a replication request indicating a target storage volume within an underlying storage volume, and responsively identify changed and allocated blocks within the underlying storage volume. Replication system 300 includes data utility 310, replication request 311, replica control system 320, virtual machine (VM) environment 330, and replica virtual machine (VM) environment 340. Data utility 310 is in communication with replica control system 320. Replica control system 320 is in communication with VM environment 330 and VM environment 340.

VM environment 330 includes an underlying storage volume 335. Underlying storage volume 335 includes target storage volume 331. Underlying storage volume 335 comprises any storage volume capable of storing a volume of data. Underlying storage volume 335 may be, for example, a virtual disk file in a virtual machine environment or a hard disk drive upon which the virtual disk file is stored. The hard disk drive may be a single disk, a disk array, or some other type of storage system, including any combination or variation thereof. Furthermore, the hard disk may be within a computer or server computer. Other elements of VM environment 330 may include, for example, virtual machines, hypervisors, server machines, and other underlying virtual files. Other elements are also possible although not shown for simplicity. Virtual disk files may be, for example, VMWare images (.vmdk files), VirtualBox images (.vdi files), Virtual Hard Disk images (.vhd), and/or other image format files, including combinations or variations thereof.

Likewise, target storage volume 331 and replica storage volume 341 each comprise any storage volume within an underlying storage volume that is capable of storing a volume of data. Target storage volume 331 may be, for example, an enumeration of a virtual machine environment, a virtual disk file in a virtual machine environment, or a virtual drive contained within a virtual disk file in a virtual machine environment. As shown, target storage volume 331 includes blocks A, B, C, and D. Each block comprises a section of underlying storage volume 335.

In this example, a single underlying storage volume 335 is shown for simplicity. It is appreciated that VM environment 330 may include any number of underlying storage volumes. Furthermore, a single target storage volume 331 is shown stored on underlying storage volume 335 for simplicity. It is appreciated that any number of target storage volumes may be included on each underlying storage volume within VM environment 330.

Replica VM environment 340 includes an underlying storage volume 345. Underlying storage volume 345 includes replica storage volume 341 (a replica of storage volume 331). Underlying storage volume 345 comprises any storage volume capable of storing a volume of data. Underlying storage volume 345 may be, for example, a virtual disk file in a virtual machine environment or a hard disk drive upon which the virtual disk file is stored. The hard disk drive may be a single disk, a disk array, or some other type of storage system, including any combination or variation thereof. Furthermore, the hard disk may be within a computer or server computer.

Replica storage volume 341 is an updated or modified version of target storage volume 331 including blocks A, B, C, and D. It is appreciated that a replica storage volume may not be exact copy of the target storage volume when created and/or after modification. In this example, replica VM environment 340 is geographically diverse from VM environment 330, although it is appreciated that the VM environment 330 and replica VM environment 340 may be co-located.

Replica control system 320 provides data utility 310 with access to VM environment 330. Replica control system 320 may be any device or system capable of receiving replication request 311 or other instruction from data utility 310 (e.g., new replication or update instruction) and communicating with data utility 310, VM environment 330, and replica VM environment 340. Alternatively or additionally, replica control system 320 may provide access to data utility 310 by way of an enumeration of or file system view of virtual machine environment 330 (discussed in more detail with reference to FIG. 10).

It is appreciated that data may need to be accessed for a variety of applications. Data utility 310 may be, for example, compliance software, security software, backup software, log analytics software, replication software, and/or patch management software. For example, data utility 310 may need to access VM environment 330 for scanning, for identifying changed data items on a computer (e.g., data forensics), for compliance needs, or in order to log system changes.

As shown, blocks B, C, and D have changed and blocks A, B, and D are allocated. Thus, only blocks B and D are both changed and allocated. Replica control system 320 identifies the allocated block and the free blocks (unallocated blocks) prior to reading the blocks from virtual machine environment 330. Accordingly, in response to a request to update replica VM environment 340, replica control system 320 only has to transfer those blocks that have changed and that are allocated. In this case, blocks B and D are identified as the only blocks that need to be transferred. Reading only those blocks that have changed and that are allocated optimizes the reading of VM environment 330 and the writing to replica VM environment 340.

Figure 4:
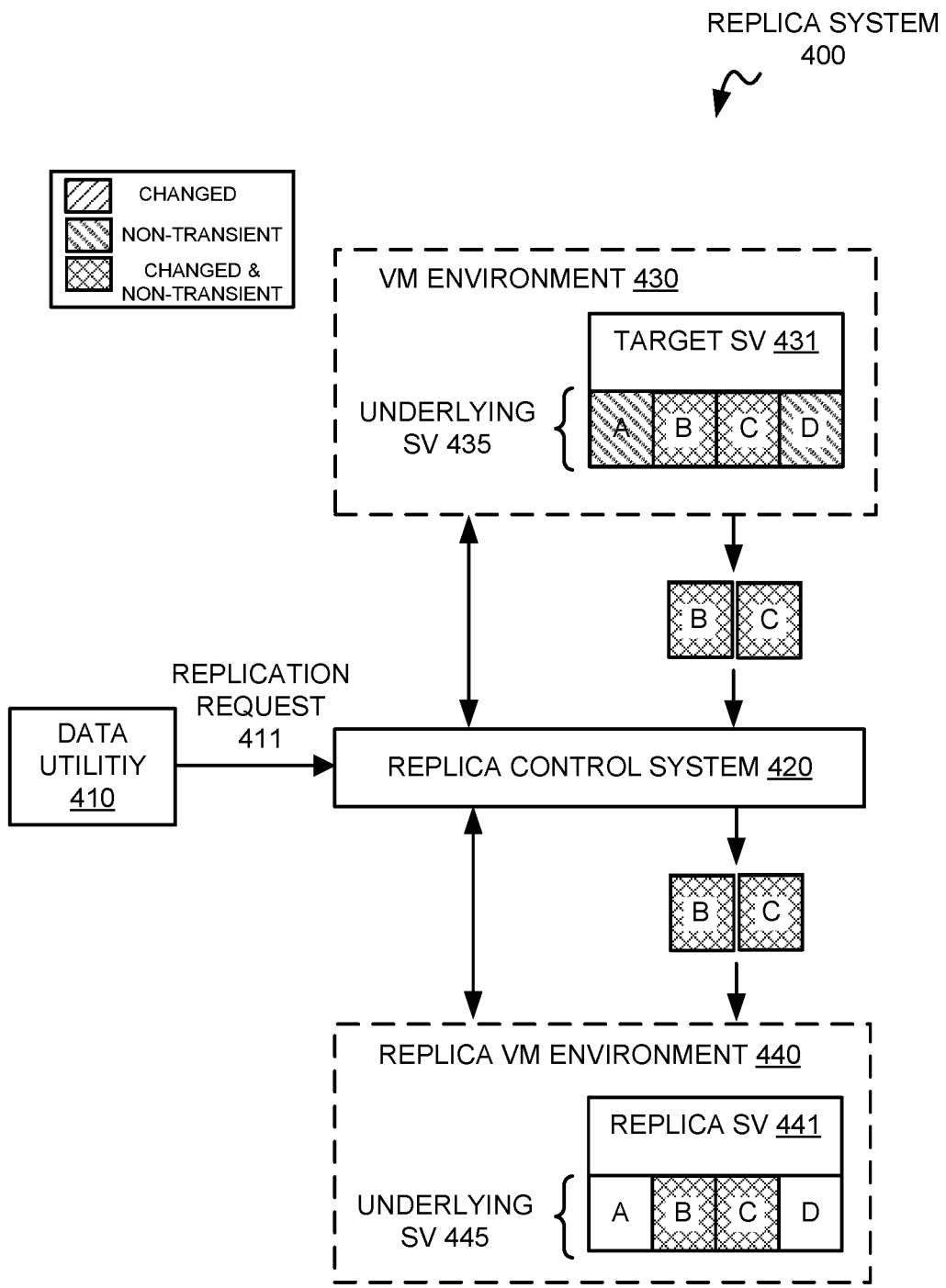
FIG. 4 illustrates a replication system in an embodiment.

FIG. 4 illustrates replication system 400. In particular, FIG. 4 illustrates replica control system 420 configured to receive a replication request indicating a target storage volume within an underlying storage volume, and responsively identify changed and non-transient blocks within the underlying storage volume. Replication system 400 includes data utility 410, replication request 411, replica control system 420, virtual machine (VM) environment 430, and replica virtual machine (VM) environment 440. Data utility 410 is in communication with replica control system 420. Replica control system 420 is in communication with VM environment 430 and VM environment 440.

VM environment 430 includes an underlying storage volume 435. Underlying storage volume 435 includes target storage volume 431. Underlying storage volume 435 comprises any storage volume capable of storing a volume of data. Underlying storage volume 435 may be, for example, a virtual disk file in a virtual machine environment or a hard disk drive upon which the virtual disk file is stored. The hard disk drive may be a single disk, a disk array, or some other type of storage system, including any combination or variation thereof. Furthermore, the hard disk may be within a computer or server computer. Other elements of VM environment 430 may include, for example, virtual machines, hypervisors, server machines, and other underlying virtual files. Other elements are also possible although not shown for simplicity. Virtual disk files may be, for example, VMWare images (.vmdk files), VirtualBox images (.vdi files), Virtual Hard Disk images (.vhd), and/or other image format files, including combinations thereof.

Likewise, target storage volume 431 and replica storage volume 431 each comprise any storage volume within an underlying storage volume that is capable of storing a volume of data. Target storage volume 431 may be, for example, an enumeration of a virtual machine environment, a virtual disk file in a virtual machine environment, or a virtual drive contained within a virtual disk file in a virtual machine environment. As shown, target storage volume 431 includes blocks A, B, C, and D. Each block comprises a section of underlying storage volume 435.

In this example, a single underlying storage volume 435 is shown for simplicity. It is appreciated that VM environment 430 may include any number of underlying storage volumes. Furthermore, a single target storage volume 431 is shown stored on underlying storage volume 435 for simplicity. It is appreciated that any number of target storage volumes may be included on each underlying storage volume within VM environment 430.

Replica VM environment 440 includes an underlying storage volume 445. Underlying storage volume 445 includes replica storage volume 441 (a replica of storage volume 431). Underlying storage volume 445 comprises any storage volume capable of storing a volume of data. Underlying storage volume 445 may be, for example, a virtual disk file in a virtual machine environment or a hard disk drive upon which the virtual disk file is stored. The hard disk drive may be a single disk, a disk array, or some other type of storage system, including any combination or variation thereof. Furthermore, the hard disk may be within a computer or server computer.

Replica storage volume 441 is an updated or modified version of target storage volume 431 including blocks A, B, C, and D. It is appreciated that a replica storage volume may not be exact copy of the target storage volume when created and/or after modification. In this example, replica VM environment 440 is geographically diverse from VM environment 430, although it is appreciated that the VM environment 430 and replica VM environment 440 may be co-located.

Replica control system 420 provides a data utility 410 with access to VM environment 430. Replica control system 420 may be any device or system capable of receiving replication request 411 or other instruction from a data utility 410 (e.g., new replication or update instruction) and communicating with data utility 410, VM environment 430, and replica VM environment 440. Alternatively or additionally, replica control system 420 may provide access to data utility 410 by way of an enumeration of or file system view of virtual machine environment 430 (discussed in more detail with reference to FIG. 10).

It is appreciated that data may need to be accessed for a variety of applications. Data utility 410 may be, for example, compliance software, security software, backup software, log analytics software, replication software, and/or patch management software. For example, data utility 410 may need to access VM environment 430 for scanning, for identifying changed data items on a computer (e.g., data forensics), for compliance needs, or in order to log system changes.

As shown, blocks B, C, and D have changed and blocks A, B, and C are non-transient. Thus, only blocks B and C are both changed and non-transient. Replica control system 420 identifies the transient and non-transient blocks prior to reading the blocks from virtual machine environment 430. Accordingly, in response to a request to update replica VM environment 440, replica control system 420 only has to transfer those blocks that have changed and that are allocated. In this case, blocks B and C are identified as the only blocks that need to be transferred. Reading only those blocks that have changed and that are non-transient optimizes the reading of VM environment 430 and the writing to replica VM environment 440.

Non-transient blocks are those blocks containing files that are not temporarily stored. For example, in some instances Microsoft Word and other software applications create temporary files. These files are temporary and unimportant to the data utility (e.g., back-up software). As such, these transient files need not be accessed and transferred during replication.

Figure 5:
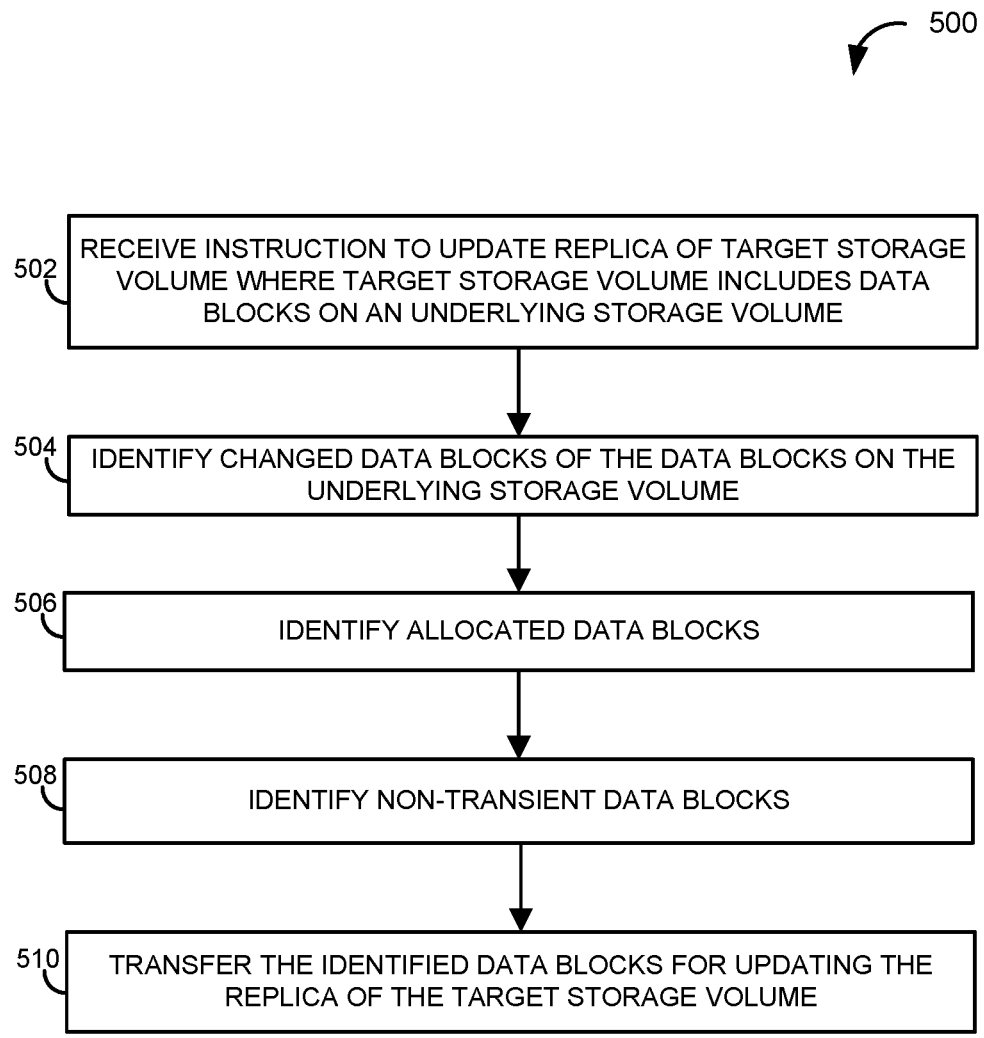
FIG. 5 illustrates operation of replica control system in an embodiment.

FIG. 5 illustrates process 500 describing the operation of a replica control system in a replication system. More specifically, FIG. 5 illustrates the combined operation of replica control system 320 of FIG. 3 and replica control system 420 of FIG. 4 to receive a replication request indicating a target storage volume within an underlying storage volume, and responsively identify changed, allocated, and non-transient blocks within the underlying storage volume.

To begin, a replica control system receives an instruction to update a replica of target storage volume (Step 502). As discussed, a target storage volume comprises a plurality of data blocks (blocks A, B, C, and D) on an underlying storage volume. For example, replica control system 320 or 420 may receive a replication request to update a replica of the target storage volume comprising a plurality of data blocks within an underlying storage volume.

Replica control system 320 or 420 then identifies changed data blocks of the plurality of data blocks (Step 504). In this example, changed blocks 136 include blocks B', C', and D'. The changed data blocks may be determined or identified using a changed block list which may be maintained by the storage volume, other elements within the VM environment, or the replica control system.

Once the changed data blocks are identified, the replica control system identifies which of the changed blocks are also allocated or "live" (Step 506). The allocated data blocks of the changed data blocks may be identified based on an allocation status of a plurality of data items contained in a secondary storage volume (not shown).

The secondary storage volume may comprise a virtual drive within a virtual machine. In this case, the replica control system may read the file system metadata from a Guest OS on the virtual machine to determine which section or sections of the secondary storage volume are allocated or non-allocated (i.e., redundant or no longer in use). The replica control system may then identify those allocated individual data items (i.e., files on the virtual storage drive) that also correspond to the changed data blocks. The replica control system may use a block mapping table to correspond or correlate the data blocks to the data items. This process is discussed in more detail with respect to FIG. 9.

The replica control system then identifies non transient data blocks (Step 208). As discussed, non-transient blocks are those blocks containing files that are not temporarily stored. In this example, the replica control system identifies the non-transient blocks in a manner similar to the way that the replica control system identifies allocated blocks. That is, the replica control system reads the file system metadata from a Guest OS on the virtual machine to determine which data items or files are non-transient. The replica control system then identifies those non-transient data items (i.e., files on the virtual storage drive) that also correspond to the changed data blocks and allocated data items. The replica control system may use a block mapping table to correspond or correlate the data blocks to the data items. This process is discussed in more detail with respect to FIG. 9.

Finally, the identified data blocks (changed, allocated, and non-transient) are transferred to a replication VM environment in order to update a replica storage volume (Step 510).

Figure 6:
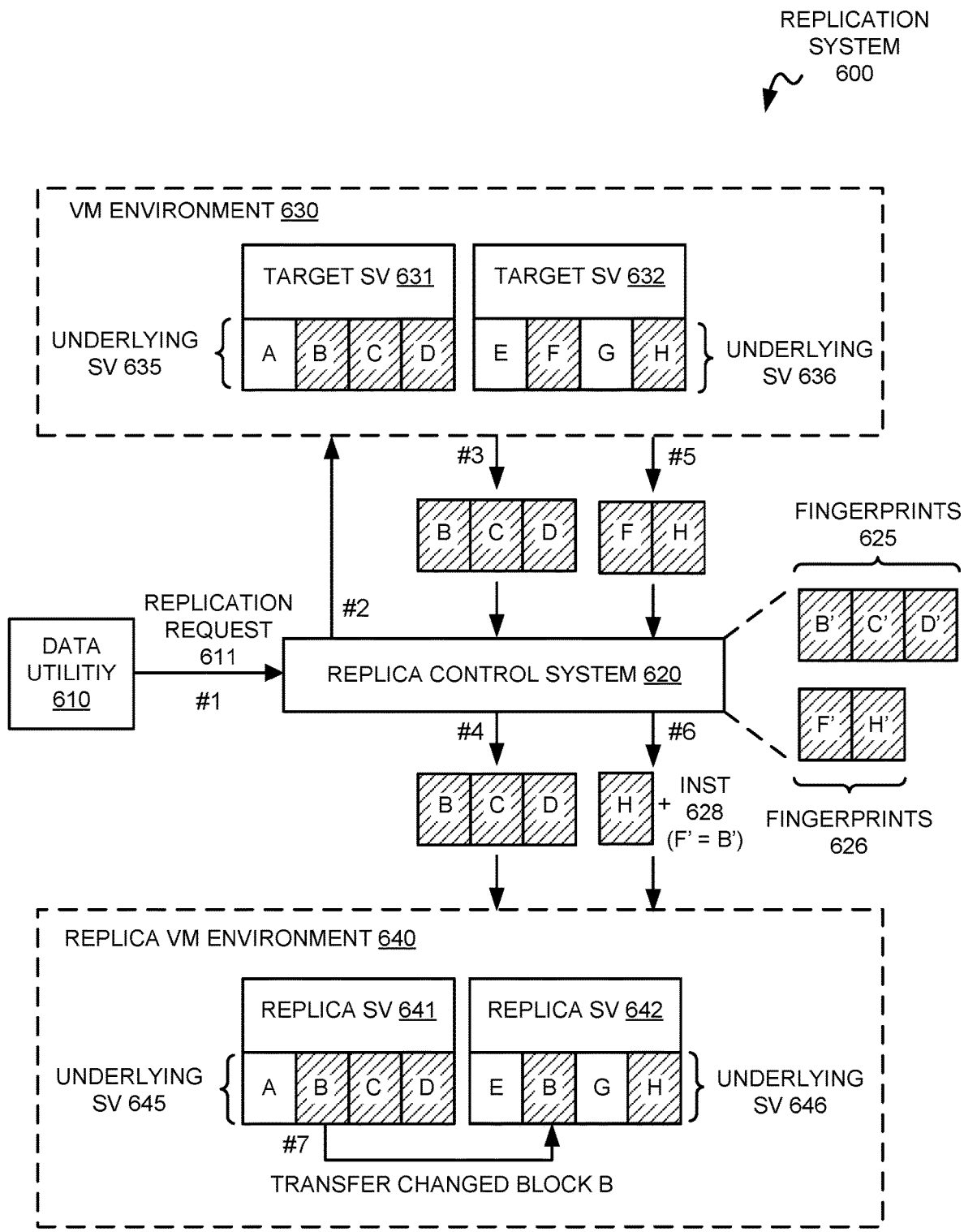
FIG. 6 illustrates a replication system in an embodiment.

FIG. 6 illustrates replication system 600. In particular, FIG. 6 illustrates replica control system 620 configured to receive a replication request indicating multiple target storage volumes within one or more underlying storage volumes, and responsively identify a similarity of changed data blocks from a target storage volume relative to changed data blocks from another target storage volume.

Replication system 600 includes data utility 610, replication request 611, replica control system 620, virtual machine (VM) environment 630, and replica virtual machine (VM) environment 640. Data utility 610 is in communication with replica control system 620. Replica control system 620 is in communication with VM environment 630 and VM environment 640.

VM environment 630 includes underlying storage volumes 635 and 636. Underlying storage volume 635 includes target storage volume 631. Underlying storage volume 636 includes target storage volume 632. Underlying storage volumes 635 and 636 comprise any storage volumes capable of storing a volume of data. Underlying storage volumes 635 and 636 may each be, for example, virtual disk files in a virtual machine environment or a hard disk drive upon which the virtual disk file is stored. The hard disk drive may be a single disk, a disk array, or some other type of storage system, including any combination or variation thereof. Furthermore, the hard disk may be within a computer or server computer.

Other elements of VM environment 630 may include, for example, virtual machines, hypervisors, server machines, and other underlying virtual files. Other elements are also possible although not shown for simplicity. Virtual disk files may be, for example, VMWare images (.vmdk files), VirtualBox images (.vdi files), Virtual Hard Disk images (.vhd), and/or other image format files, including combinations thereof.

Target storage volumes 631 and 632 each comprise any storage volume within an underlying storage volume that is capable of storing a volume of data. Target storage volumes 631 and 632 may be, for example, an enumeration of a virtual machine environment, a virtual disk file in a virtual machine environment, or a virtual drive contained within a virtual disk file in a virtual machine environment. As shown, target storage volume 631 includes blocks A, B, C, and D. Each block comprises a section of underlying storage volume 635. Target storage volume 632 includes blocks E, F, G, and H. Each block comprises a section of underlying storage volume 636.

In this example, two underlying storage volumes 635 and 636 are shown. It is appreciated that VM environment 630 may include any number of underlying storage volumes including a single underlying storage volume. Furthermore, two target storage volumes 631 and 632 are shown stored on underlying storage volumes 635 and 636, respectively. It is appreciated that any number of target storage volumes may be included on each underlying storage volume within VM environment 630.

Replica VM environment 640 includes underlying storage volumes 645 and 646. Underlying storage volume 645 includes replica storage volume 641 (a replica of storage volume 631). Underlying storage volume 646 includes replica storage volume 642 (a replica of storage volume 632). Underlying storage volumes 645 and 646 comprise any storage volumes capable of storing a volume of data. Underlying storage volumes 645 and 646 may be, for example, a virtual disk file in a virtual machine environment or a hard disk drive upon which the virtual disk file is stored. The hard disk drive may be a single disk, a disk array, or some other type of storage system, including any combination or variation thereof. Furthermore, the hard disk may be within a computer or server computer.

As discussed, replica storage volume 641 is an updated or modified version of target storage volume 631 including blocks A, B, C, and D. Likewise, replica storage volume 642 is an updated or modified version of target storage volume 642 including blocks E, F, G, and H. It is appreciated that a replica storage volume may not be exact copy of the target storage volume when created and/or after modification. In this example, replica VM environment 640 is geographically diverse from VM environment 630, although it is appreciated that the VM environment 630 and replica VM environment 640 may be co-located.

Replica control system 620 provides data utility 610 with access to VM environment 330. Replica control system 620 may be any device or system capable of receiving replication request 611 or other instruction from a data utility 610 (e.g., new replication or update instruction) and communicating with data utility 610, VM environment 630, and replica VM environment 640. Alternatively or additionally, replica control system 320 may provide access to data utility 610 by way of an enumeration of or file system view of virtual machine environment 630 (discussed in more detail with reference to FIG. 10).

As shown, blocks B, C, and D are shown shaded to indicate that they have changed within underlying storage volume 635 and blocks F and H have changed within underlying storage volume 636. Replica control system 620 is configured to identify a similarity of changed data blocks from a target storage volume relative to changed data blocks from another target storage volume. In one example, replica control system 620 generates fingerprints of the changed blocks to identify these similarities, and thus replica control system 620 generates fingerprints 625 and fingerprints 626.

Fingerprints 625 comprise fingerprints of the changed blocks from target storage volume 631 (fingerprints B', C', and D'). Similarly, fingerprints 626 comprise fingerprints of the changed blocks from target storage volume 632 (fingerprints F' and H'). In this example, in order to identify the similarity, replica control system 620 compares the fingerprints to determine whether any of the data blocks comprising target storage 631 are the same as data blocks comprising target storage volume 632. In this example, fingerprint F' is the same as fingerprint B'. Advantageously, changed block F (which is the same as changed block B) never needs to be transmitted to replica VM environment 640.

Figure 7:
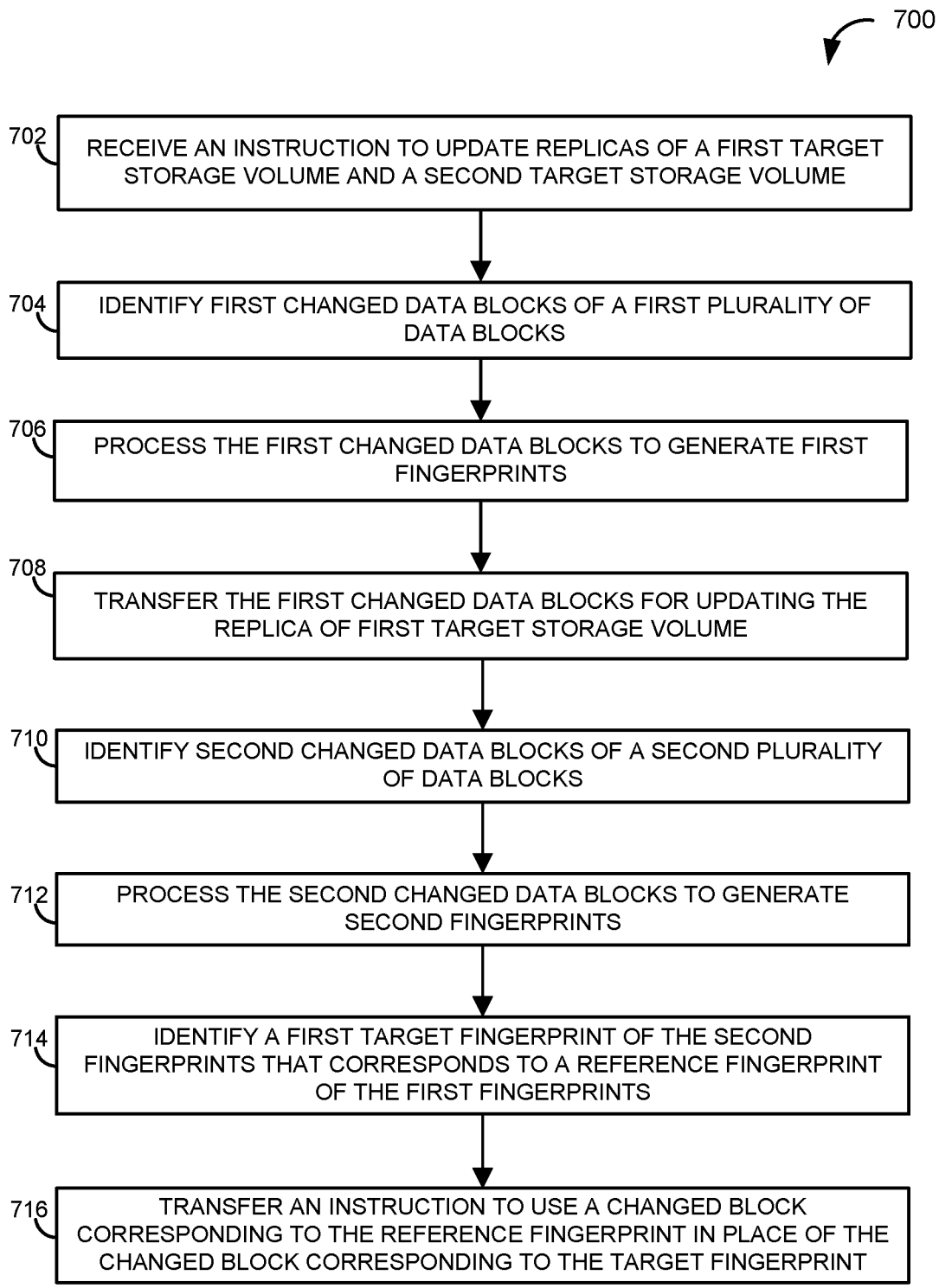
FIG. 7 illustrates operation of replica control system in an embodiment.

FIG. 7 illustrates process 700 describing the operation of replica control system 620 for updating replica storage volumes 641 and 642 corresponding to target storage volumes 631 and 632, respectively. To begin, replica control system 620 receives a replication instruction to update replicas of first target storage volume 631 and second target storage volume 632 (Step 702). In this case, the replica of target storage volume 631 is replica storage volume 641 and the replica of target storage volume 632 is replica storage volume 642.

As discussed, target storage volume 631 comprises a plurality of data blocks (blocks A, B, C, and D) on underlying storage volume 631. As shown, blocks B, C, and D are shaded to indicate that they have changed since the original replica of target storage volume 631 was created. Similarly, target storage volume 632 comprises a plurality of data blocks (blocks E, F, G, and H) on underlying storage volume 636. In this case, blocks F and H are shown shaded to indicate that they have changed since the original replica of target storage volume 632 was created.

Replica control system 620 then identifies first changed data blocks of the first plurality of data blocks (Step 704). In this case, target storage volume 631 comprises the first plurality of data blocks (blocks A, B, C, and D) on underlying storage volume 635. The first changed data blocks (blocks B, C, and D) may be determined using a changed block list which may be maintained by the storage volume, other elements in VM environment 630, replica control system 620, or as otherwise described herein.

Once the first changed data blocks are identified, replica control system 620 processes the first changed data blocks to generate first fingerprints (Step 706). In this case, replica control system 620 generates first fingerprints 625. It is appreciated that fingerprints may also be generated within VM environment 630. Fingerprint B' corresponds to changed block B, fingerprint C' corresponds to changed block C, and fingerprint D' corresponds to changed block D.

Fingerprints may be created by generating a checksum for each of the changed blocks. The checksum may be any fixed-sized datum computed from the changed blocks on a specified storage volume for the purpose of comparing to generated checksums of changed blocks on other storage volumes. If the checksums match, then the changed blocks the same, and thus interchangeable.

Replica control system 620 transfers the first changed data blocks to replica VM environment 640 for updating the replica of first target storage volume 631 (Step 708). In this case, replica storage volume 641 is shown with updated changed blocks B, C, and D.

Replica control system 620 then identifies second changed data blocks of the second plurality of data blocks (Step 710). In this case, target storage volume 632 comprises the second plurality of data blocks (blocks E, F, G, and H) on underlying storage volume 635. The second changed data blocks (blocks F and G) may be determined using a changed block list which may be maintained by the storage volume, other elements in VM environment 630, or replica control system 620. As shown, changed blocks F and H are transferred from VM environment 630 to replica control system 620. It is appreciated that the actual changed blocks may not be transferred in order to determine the fingerprint. Again, the fingerprint may be determined at VM environment 630 to avoid reading the changed blocks and/or transferring blocks unnecessarily.

Once the second changed data blocks are identified, replica control system 620 processes the second changed data blocks to generate second fingerprints (Step 712). In this case, replica control system 620 generates second fingerprints 626. It is appreciated that that fingerprints may also be generated in VM environment 630. Fingerprint F' corresponds to changed block F and fingerprint H' corresponds to changed block H.

Replica control system 620 then identifies a first target fingerprint of the second fingerprints that corresponds to a reference fingerprint of the first fingerprints (Step 714). Identifying the first target fingerprint of the second fingerprints that corresponds to a reference fingerprint of the first fingerprints involves comparing the fingerprints or checksums of the first fingerprints (fingerprints B', C', and D') with the second fingerprints (fingerprints F' and H'). If the checksums match, then the changed blocks are almost certainly the same.

In this case, replica control system 620 compares fingerprints B', C', and D' with fingerprints F' and H' and determines that target fingerprint F' matches reference fingerprint B'. Advantageously, replica control system 620 does not have to transfer changed block F' to replica environment 640 in order to update replica storage volume 642. Instead, replica control system 620 may transfer an instruction 628 to use a changed block corresponding to the reference fingerprint in place of a changed block corresponding to the target fingerprint (Step 716). In this case, instruction 628 is transferred to replica VM environment 640. In response to the instruction, replica VM environment 640 uses the previously transferred changed block B in place of previous block F. Advantageously, changed block F (which is the same as changed block B) never needs to be transmitted to replica VM environment 640.

Figure 8:
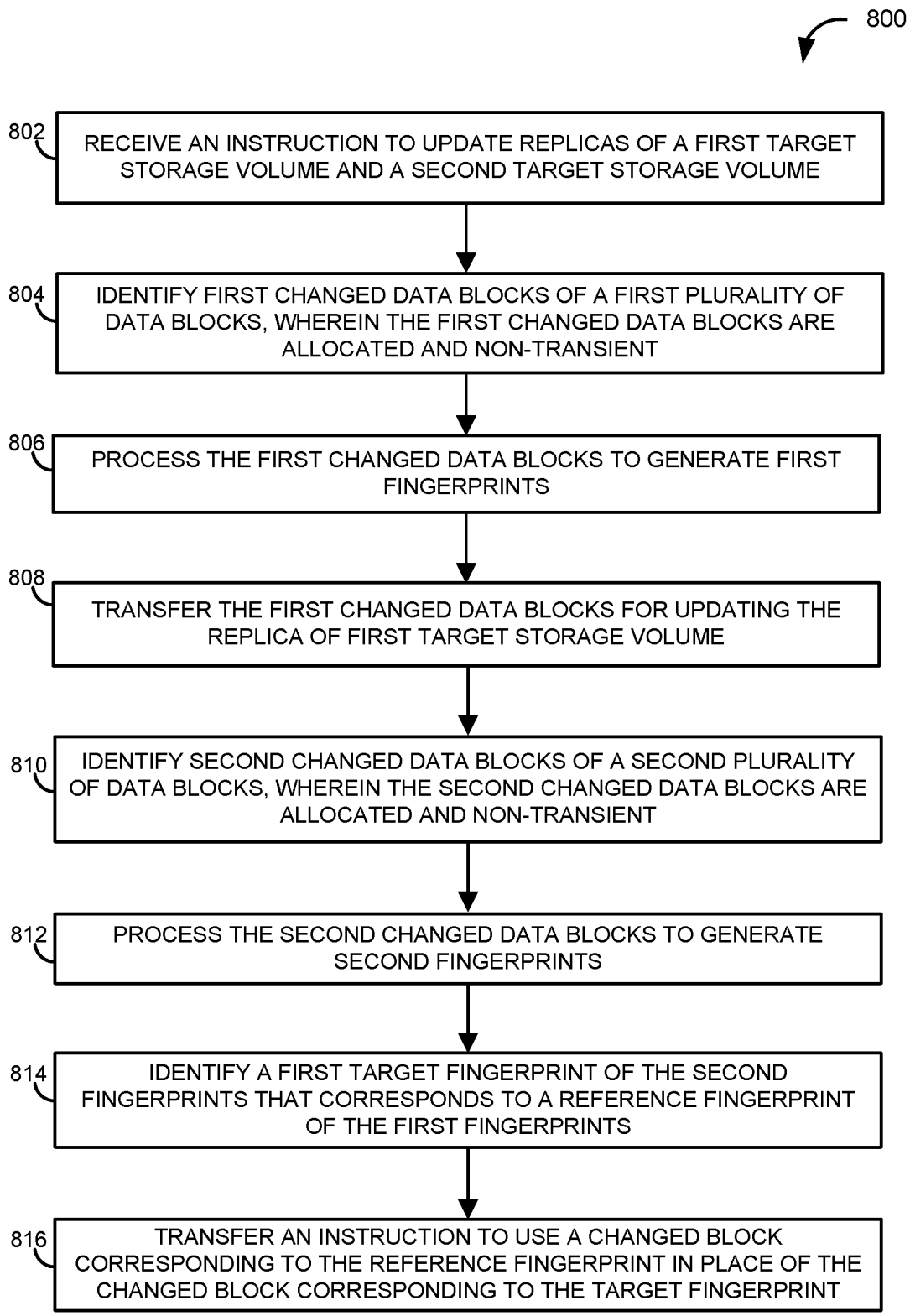
FIG. 8 illustrates operation of replica control system in an embodiment.

FIG. 8 illustrates process 800 describing the operation of a replica control system 620 for updating replica storage volumes 641 and 642 corresponding to target storage volumes 631 and 632, respectively. The steps of process 800 are similar to the steps of process 700. However, rather than simply identifying changed blocks and generating fingerprints, process 800 requires identifying only those blocks that are changed, allocated, and non-transient. Steps 804 and 810 include these additional limitations. Identifying the changed, allocated, and non-transient status for each of the data blocks occurs as described herein.

Figure 9:
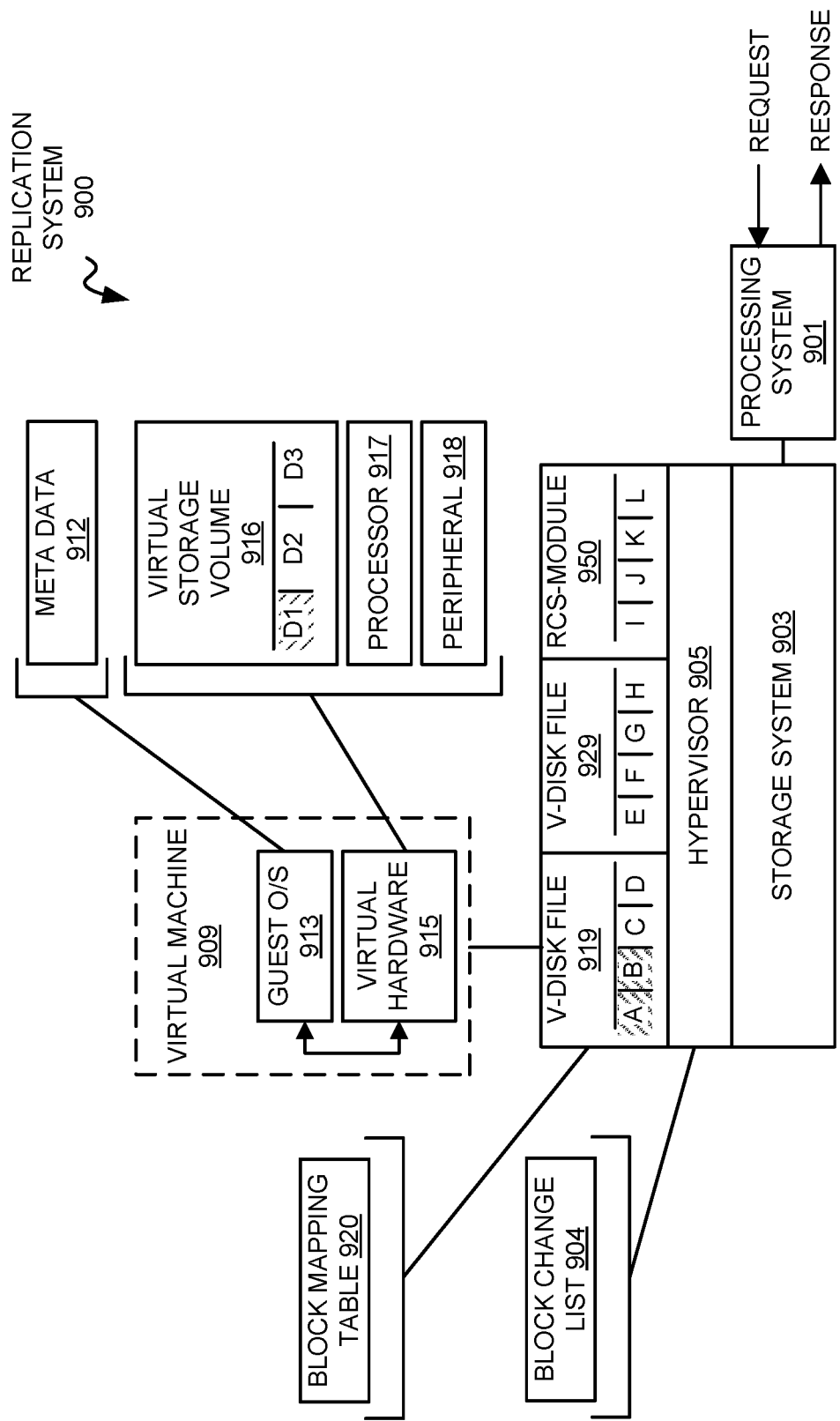
FIG. 9 illustrates a replication system in an embodiment.

FIG. 9 illustrates replication system 900. More specifically, FIG. 9 illustrates a replication control system in an embodiment whereby RCS module 950 operates to identify data blocks in a virtual disk file and transfer those data blocks to a geographically diverse area for replication. In this example, replication system 900 comprises a virtual machine environment.

Replication system 900 includes processing system 901, and storage system 903. Hypervisor 905 runs on storage system 903. Virtual disk files 919 and 929 and RCS module 950 run on hypervisor 905. As shown, RCS module 950 runs on hypervisor 905, however in some embodiments, RCS module 950 may run directly on storage system 903 or on another hypervisor (not shown) running on storage system 903 or another storage system (not shown).

Hypervisor 905 keeps track of those data blocks that have changed using a block change list 904. Block change list 904 describes the blocks that have changed in virtual disk files 919 and 929. In some example, hypervisor 905 generates block change list 904. It is appreciated that block change list 904 may alternatively or additionally be generated by any entity within virtual machine 909 (such as guest operating system 913), processing system 901, and/or storage system 903. Moreover, changed block list 904 may be generated by replication software, continuous data protection (CDP) software, or virtual disk change block tracking software running on virtual machine 909, hypervisor 905, or processing system 901.

Virtual disk files 919 and 929 may be, for example, VMWare images (.vmdk files), VirtualBox images (.vdi files), Virtual Hard Disk images (.vhd), and/or other image format files, including combinations thereof. Virtual disk files 919 and 929 include block mapping tables. Block mapping table 920 describes the storage of the data volume in virtual disk file 919. For example, block mapping table 920 may describe the correspondence between data items on virtual storage volume 916 and underlying virtual disk file 919.

As discussed, hypervisor 905 includes virtual machines represented by virtual disk files 919 and 929. In particular, virtual disk file 919 represents virtual machine 909. Virtual machine 909 includes guest operating system 913 and virtual hardware 915. Guest operating system 913 includes meta data 912. Virtual hardware 915 includes virtual storage volume 916, virtual processor 917, and virtual peripheral 918.

In operation, processing system 901, executing software including RCS module 950, identifies and transfers changed, allocated, and non-transient data blocks corresponding to a request target storage volume. As shown in this example, processing system 901 receives a replication request to retrieve data blocks from virtual disk file 919. Processing system 901 executing RCS module 950 operates as described herein to identify and transfers changed, allocated, and non-transient data blocks corresponding to a request target storage volume.

For example, processing system 901, executing software including RCS module 950 first identifies changed data blocks of the plurality of data blocks in the target storage volume. In this example, the target storage volume comprises virtual disk file 919. The block change list 904 indicates that blocks A and B have changed.

Processing system 901 executing DC module 950 subsequently identifies allocated data blocks of the changed data blocks based on an allocation status of a plurality of data items contained in virtual storage volume 916, wherein the plurality of data items correspond to the changed segments. The block mapping table 920 and meta data 912 are accessed to accomplish this task. Meta data 920 may be accessed from guest operating system 913 to determine the allocation status and transient status of data items D1, D2, and D3. In this example, data item D1 corresponds to changed block A and is allocated and non-transient. Thus, processing system 901 executing RCS module 905 may then transfer data block A to a replica virtual machine environment in response to the replication request.

Figure 10:
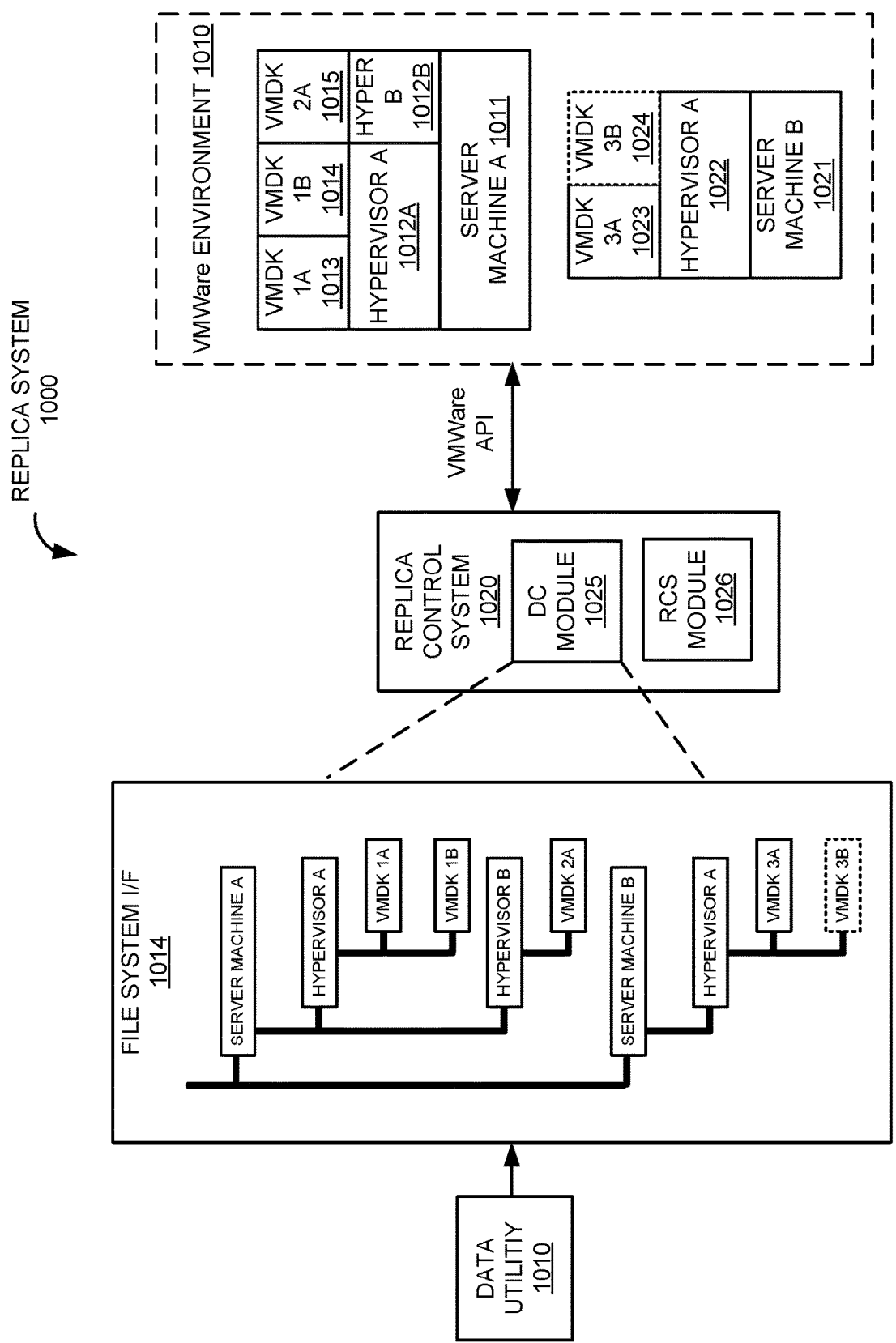
FIG. 10 illustrates a replication system in an embodiment.

FIG. 10 illustrates a replica control system in replication system 1000 to provide a data utility with an enumeration or file system view of a virtual machine environment. Replication system 1000 includes data utility 1010, file system interface 1014, replica control system 1020, and VMware environment 1010. Replica control system 1020 is in communication with virtual system environment 1010 and data utility 1010.

Replica control system 1020 comprises any system or collection of systems capable of executing RCS module 1026 to operate as described herein. Moreover, replica control system 1020 executes data control DC module 1025 to generate and display to a data utility a file system interface 1014 of a virtual machine environment.

Data control system 1020 may be a micro-processor, an application specific integrated circuit, a general purpose computer, a server computer, or any combination or variation thereof. DC module 1025 may be program instructions executable by a processing system within replica control system 1020. In this example, replication control system 1020 is shown outside the virtual machine environment (i.e., VMware environment 1010). However, it is appreciated that in some embodiments, replica control system 1020 may be located within the virtual machine environment. Moreover, in some embodiments DC module is contained within RCS module 1026.

VMware environment 1010 comprises server (or real) machines 1011 and 1021. Server machine 1011 may be may be any computer system, custom hardware, or other device. Server machines 1011 and 1021 include a storage system for storing software, and may retrieve and execute software from the storage system. The storage system could include a computer-readable medium such as a disk, tape, integrated circuit, server, or some other memory device, and also may be distributed among multiple memory devices. Each server machine 1011 and 1021 acts as a host machine. In this example, two host machines are shown for simplicity. It is appreciated that any number of host machines may be included in VMware environment 1010.

Server machine 1011 comprises hypervisors 1012A and 1012B. Hypervisors allow multiple operating systems to run concurrently on server machine 1011 (i.e., a host machine). In this example two hypervisors are shown on server machine 1011 for simplicity. It is appreciated that more or fewer hypervisors may be present on each server machine. As shown in this example, hypervisor 1012A includes two virtual disk files VMDK 1A 1013 and VMDK 1B 1014. The virtual disk files are associated with the hypervisor. In this example, all of the hypervisors in VMWare environment 1010 are VMWare hypervisors, and thus each of the virtual disk files is a VMDK file. It is appreciated that a virtual system environment may include multiple hypervisors from multiple venders or a single vender other than VMWare.

Server machine 1021 comprises hypervisor 1022. As shown, hypervisor 1022 includes VMDK A 1023. Virtual machine images or virtual disk files may be, for example, VMWare images (.vmdk files), VirtualBox images (.vdi files), Virtual Hard Disk images (.vhd), and/or other image format files, including combinations thereof. The virtual disk files or VMDK files in this example, may comprises a plurality of blocks which together may comprise one or more secondary storage volumes including data items or files (not shown for simplicity).

In operation, replica control system executing DC module 1025 provides file system view 1014 to data utility 1010. Data utility 1010 may then use the file system view or an enumeration of the virtual machine environment, which may be presented as a drive to the data utility, to generate a replication request. The data utility 1010 transfers the replication request to the replica control system indicating the target volume.

In some cases, the target storage volume comprises an enumeration of a virtual machine environment and the underlying storage volume comprises a virtual disk file contained within the virtual machine environment. For example, the target storage volume may indicate a drive name such as "P:/", which represents the contents of the virtual machine environment.

In other cases, the target storage volume comprises a virtual disk virtual disk file and the underlying storage volume comprises a hard disk drive upon which the virtual disk file is stored. In yet other cases, the underlying storage volume comprises a virtual disk file and the target storage volume comprises a virtual drive contained within the virtual disk file.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer readable medium having program instructions stored thereon that, when executed by a replica control system, direct the replica control system to:

in response to a request to update a replica of a target storage volume having data items stored thereon in a secondary storage volume, identify a plurality of data blocks, which each comprise a section of an underlying storage volume that underlies the target storage volume;

identify changed data blocks of the plurality of data blocks;

identify a subset of the changed data blocks, each data block of the subset having a specified characteristic dependent upon an allocation status within the secondary storage volume of one or more of the data items corresponding to the data block, with which to update the replica of the target storage volume; and transfer the subset of the changed data blocks.

2. The non-transitory computer readable medium of claim 1 wherein the characteristic of each of the changed data blocks comprises an allocation status of each of the changed data blocks.

3. The non-transitory computer readable medium of claim 1 wherein the characteristic of each of the changed data blocks comprises a transient status of each of the changed data blocks.

4. The non-transitory computer readable medium of claim 1 wherein the characteristic of each of the changed data blocks comprises a similarity of each of the changed data blocks relative to other changed data blocks, wherein the other changed data blocks are associated with another plurality of data blocks, which each comprise a section of another underlying storage volume.

5. The non-transitory computer readable medium of claim 4 wherein the similarity is based on an analysis of fingerprints of each of the changed data blocks and the other changed data blocks.

6. The non-transitory computer readable medium of claim 5 wherein the programming instructions, when executed by the replica control system, further direct the replica control system to generate an instruction for delivery to a replica virtual machine environment, wherein the instruction indicates the similarity of one or more of the each of the changed data blocks relative to the other changed data blocks.

7. The non-transitory computer readable medium of claim 1 wherein the target storage volume comprises an enumeration of a virtual machine environment and the underlying storage volume comprises a virtual disk file contained within the virtual machine environment.

8. The non-transitory computer readable medium of claim 1 wherein the target storage volume comprises a virtual disk file and the underlying storage volume comprises a hard disk drive upon which the virtual disk file is stored.

9. The non-transitory computer readable medium of claim 8 wherein the secondary storage volume comprises a virtual drive contained within the virtual disk file.

10. A replica control system comprising:

a communication interface configured to receive a request to update a replica of a target storage volume having data items stored thereon in a secondary storage volume, and transfer an identified subset of changed data blocks of a plurality of data blocks, which each comprise a section of an underlying storage volume that underlies the target storage volume; and a processing system configured to identify the plurality of data blocks in response to receiving the request to update the replica of the target storage volume, identify the changed data blocks of the plurality of data blocks within the underlying storage volume, and identify the subset of the changed data blocks, each data block of the subset having a specified characteristic dependent upon an allocation status within the secondary storage volume of one or more of the data items corresponding to the data block, with which to update the replica of the target storage volume.

11. The replica control system of claim 10 wherein the characteristic of the changed data blocks comprises an allocation status of each of the changed data blocks.

12. The replica control system of claim 10 wherein the characteristic of each of the changed data blocks comprises a transient status of each of the changed data blocks.

13. The replica control system of claim 10 wherein the characteristic of each of the changed data blocks comprises a similarity of each of the changed data blocks relative to other changed data blocks, wherein the other changed data blocks are associated with another plurality of data blocks, which each comprise a section of another underlying storage volume.

14. The replica control system of claim 13 wherein the similarity is based on an analysis of fingerprints of the changed data blocks and the other changed data blocks.

15. The replica control system of claim 14 wherein the processing system is further configured to direct the replica control system to generate an instruction for delivery to a replica virtual machine environment, wherein the instruction indicates the similarity of one or more of the each of the changed data blocks relative to the other changed data blocks.

16. The replica control system of claim 10 wherein the target storage volume comprises an enumeration of a virtual machine environment and the underlying storage volume comprises a virtual disk file contained within the virtual machine environment.

17. The replica control system of claim 10 wherein the target storage volume comprises a virtual disk file and the underlying storage volume comprises a hard disk drive upon which the virtual disk file is stored.

18. The replica control system of claim 17 wherein the secondary storage volume comprises a virtual drive contained within the virtual disk file.

19. A method comprising:

identifying a plurality of data blocks, which each comprise a section of an underlying storage volume that underlies a target storage volume having data items stored thereon in a secondary storage volume, in response to a request to update a replica of the target storage volume;

identifying changed data blocks of the plurality of data blocks;

identifying a subset of the changed data blocks, each data block of the subset having a specified characteristic dependent upon an allocation status within the secondary storage volume of one or more of the data items corresponding to the data block, with which to update the replica of the target storage volume; and transferring the subset of the changed data blocks.

* * * * *